United States Patent Office 3,442,398
Patented May 6, 1969

3,442,398
RAILWAY VEHICLE COUPLING
Giacomo Di Bartolomeo, Turin, Italy, assignor to
Compagnia Italiana Westinghouse Freni e Segnali,
Turin, Italy
Filed Aug. 22, 1967, Ser. No. 662,499
Claims priority, application Italy, Sept. 10, 1966,
21,283/66, Patent 776,840
Int. Cl. B61g 5/06
U.S. Cl. 213—76                   9 Claims

ABSTRACT OF THE DISCLOSURE

Apparatus automatically controls opening and closing of brake pipe end cocks on uncoupling of two railway vehicles provided with automatic couplers includes a pneumatic double acting control cylinder biased to a middle position and connected by loss motion mechanical transmission to the end cock. The pneumatic control cylinder is controlled through pneumatic lines a pneumatic distributor having a member movable on affecting coupling or uncoupling to displace the piston of the control cylinder from a middle position. A pneumatic check cylinder is connected to the control cylinder and distributor to return the piston of the control cylinder to its middle position. An uncoupling valve in the pneumatic circuit has a control connected to a hand operated lever.

---

The standard U.I.C. No. 522, paragraph 25, provides that on coupling of two vehicles the brake pipes on the latter should be automatically coupled too and their end cocks on the two contiguous vehicles should be automatically opened.

Moreover, the possibility is contemplated of simultaneously closing the pipe end cocks of the contacting coupling members on two contiguous vehicles by operating the lever effecting uncoupling on either of the two vehicles involved.

The invention relates to a device adapted to automatically open and close the brake pipe end cocks, which is a logical and essential complement of the automatic coupling with a view to meeting all requirements of railway operation in accordance with the directions in the above mentioned standard.

According to the invention an automatic control device for opening and closing the end cocks on coupling of two railway vehicles provided with automatic coupling means, essentially comprising an air distributor and a control cylinder, is characterised by the fact that the abutment on coupling causes the distributor to recede, and this results in admission of air from the brake pipe through the distributor to one chamber in the control cylinder, which is linked to the end cocks whereby the end cocks on the abutting ends of the vehicles being coupled open in quick sequence.

The invention shall be described with reference to the accompanying diagrammatical drawings given by way of example only, wherein:

FIGURE 1 shows an arrangement of the distributor according to the invention adjacent a multiple electric coupler, FIGURE 2 is a modification of the arrangement shown in FIGURE 1, FIGURES 3 to 7 show the device in various operational positions.

The device according to the invention comprises the following essential components:

A cylindrical distributor D having a middle distributing stem with an O-ring, arranged on the coupling head, operated on coupling of two vehicles.

Figures 1, 2, 3:
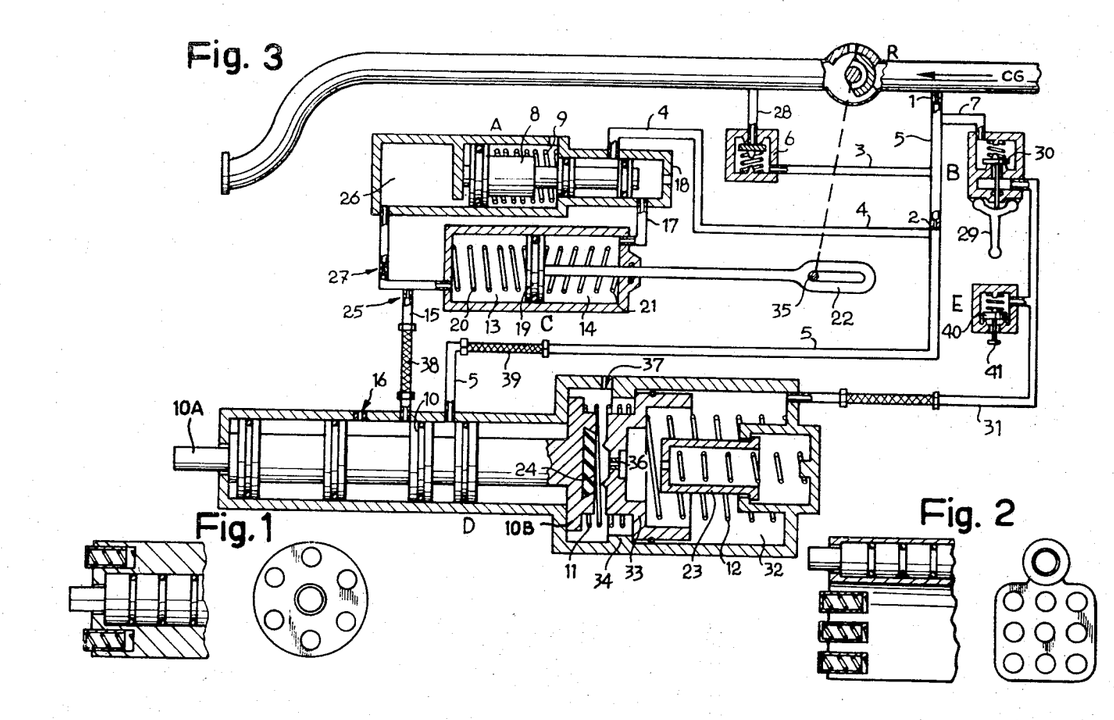

The distributor may be arranged in the middle portion of the multiple electric coupler as shown in FIGURE 1 or according to the arrangement shown in FIGURE 2.

Alternatively, the cylindrical distributor may be arranged beneath the head portion of the car, as a part of a unit further comprising the end cock and control cylinder therefor.

Figure 9:
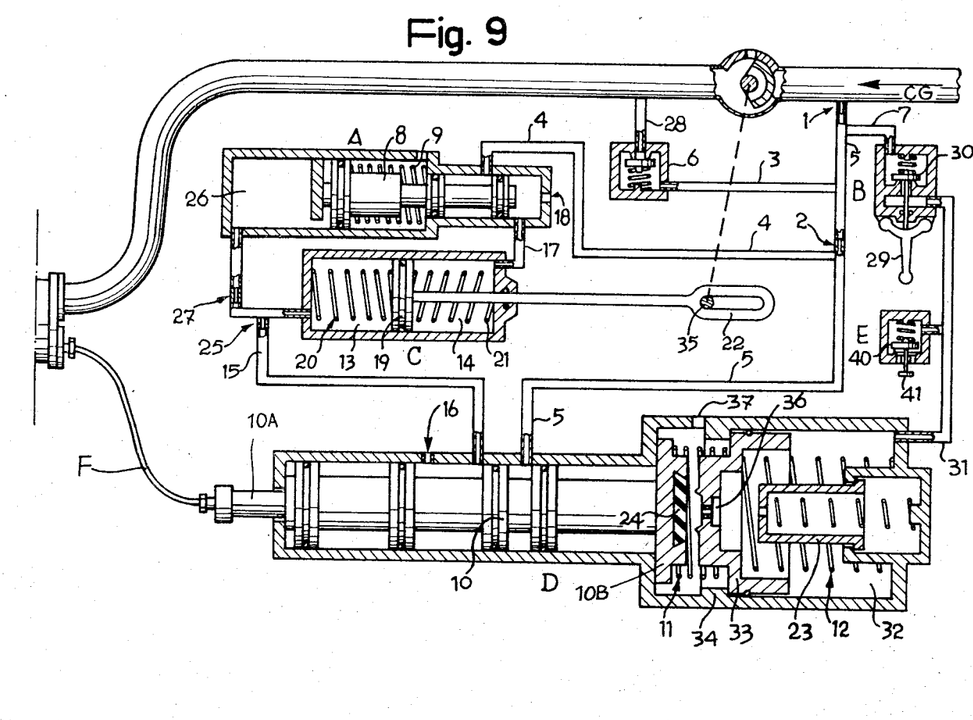

The distributor is then remotely controlled through a mechanical transmission which may be of the Flexball type as shown in FIGURE 9, thereby avoiding Bowden cables for interconnecitng the distributor and operating unit.

An operating unit arranged beneath the frame near the end cross member, comprising:

A control cylinder C of the double-acting type operating the end cock R.

Interconnection of the end cock handle and control cylinder rod is effected by a slide arrangement by which, as explained hereafter, the end cock may be independently operated either automatically or manually.

Manual operation can be effected on either side of the vehicle by acting on a lever likewise connected with the handle of the control cock.

A consent or check cylinder A ensuring smooth operation of the control cylinder on coupling and uncoupling and preventing foretimely closure of the end cock on accidental uncoupling or breakage of the hoses interconnecting the distributor and operating unit.

A shut-off device B, the lever of which is connected with the uncoupling control as shown in FIGURE 3 so that on acting to uncouple two vehicles the end cocks are closed before the vehicles become actually uncoupled.

An annulment or exhaust valve E, including a push button operated by the uncoupling control when the latter is in its annulment position.

The details of the components and their fluid connections will be described in connection with the operation of the device as follows:

(a)     UNCOUPLED VEHICLE (FIGURE 3)

Since the cock R is closed air supplied through the brake pipe CG flows through calibrated holes 1 and 2 to conduits 3, 4 and 5 and is arrested at:
check valve 6;
consent or check cylinder A, the piston 8 of which is held in its left-hand position by the spring 9;
distributor D, the piston of which is urged with its distributing stem 10 outwardly by the action of two springs 11 and 12.

Chambers 13, 14 in the control cylinder C are connected with the outside exhaust to atmosphere through a conduit 15 and a calibrated hole 16 in the distributor, and through a conduit 17 and hole 18 in the consent member, respectively.

The piston 19 in the control cylinder C is in its middle balanced position under the action of springs 20, 21 and a pin 35 interconnecting the handle of the end cock and slide 22 on the control cylinder rod is at the left-hand end of a slot in the slide.

The end 10A of stem 10 extends beyond the casing of the distributor.

Figure 4:
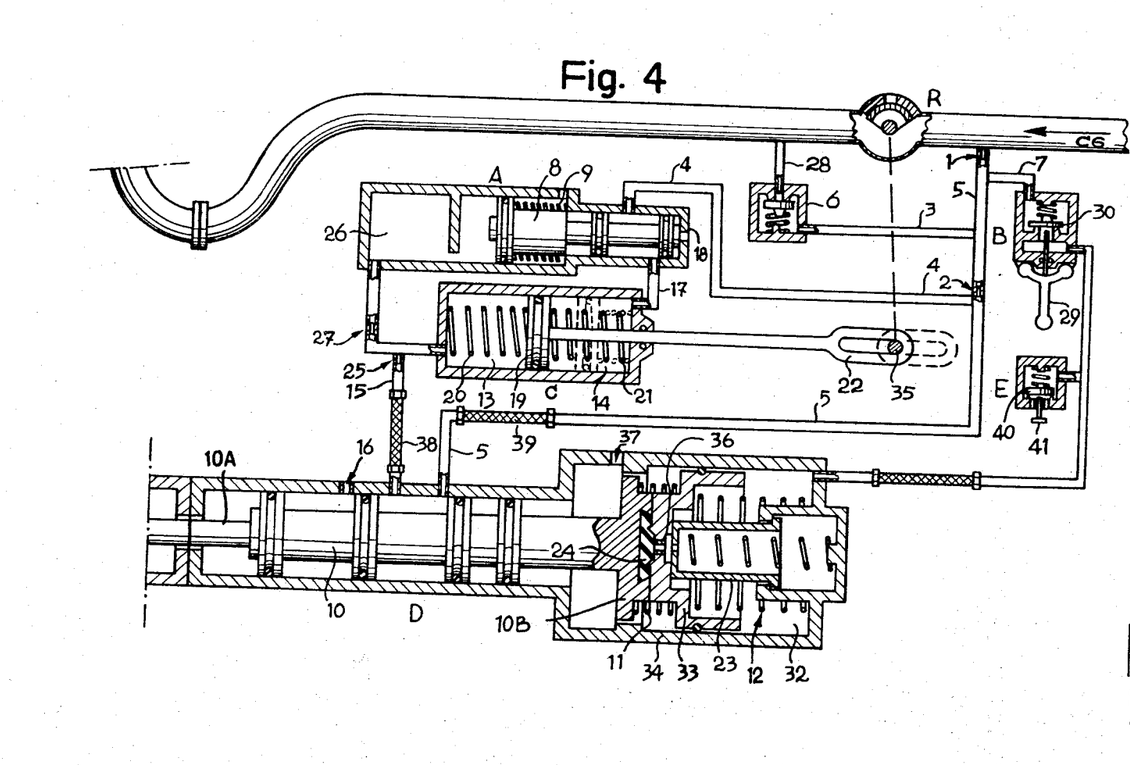

(b)     COUPLED VEHICLES (FIGURE 4)

On coupling of two vehicles the distributor pistons 10 of the contiguous ends abut and recede against the action of their respective springs 11, 12, the pistons being stopped as they contact the stabilizing spring 23 cylinder, after having closed a valve 24 at the end 10B of the stem 10.

In this position the distributor stem connects the conduit 5 with the conduit 15 and supplies compressed air to chamber 13 in the control cylinder through a calibrated hole 25. Since the opposite chamber 14 in the control cylinder is connected to the outside through the consent member (FIGURE 3), the piston 19 moves to the right and causes the end cock R to open (dashed line position in FIG. 4). At the same time compressed air is fed to the chamber 26 of the consent member A, rise in pressure therein being delayed with respect to the chamber 13 by the effect of a choke or calibrated hole 27. When the pressure in chamber 26 builds up beyond the required pressure for displacing the piston 19 in the control cylinder, the piston 8 moves to the right (to the position shown in FIG. 4) and interconnects the conduit 4 with the conduit 17 and admits air pressure to the chamber 14 in the control cylinder equal to the pressure which had built up in chamber 13. The piston 19 then moves back to its balanced position and the pin 35 is at the right-hand end of the slide (full line position in FIG. 4).

It is thereby possible to effect closing by hand of the end cock, when required since pin 35 can be moved in the slot of slide 22.

This applies to a vehicle having its brake pipe fed from the locomotive direct.

In the contiguous vehicle the air from the brake pipe which has been switched on coupling of the vehicles by means of the couplers, feeds the conduit 28 and through its check valve 6 the conduits 4, 5 and effects opening of the end cock as described above.

Figure 5:
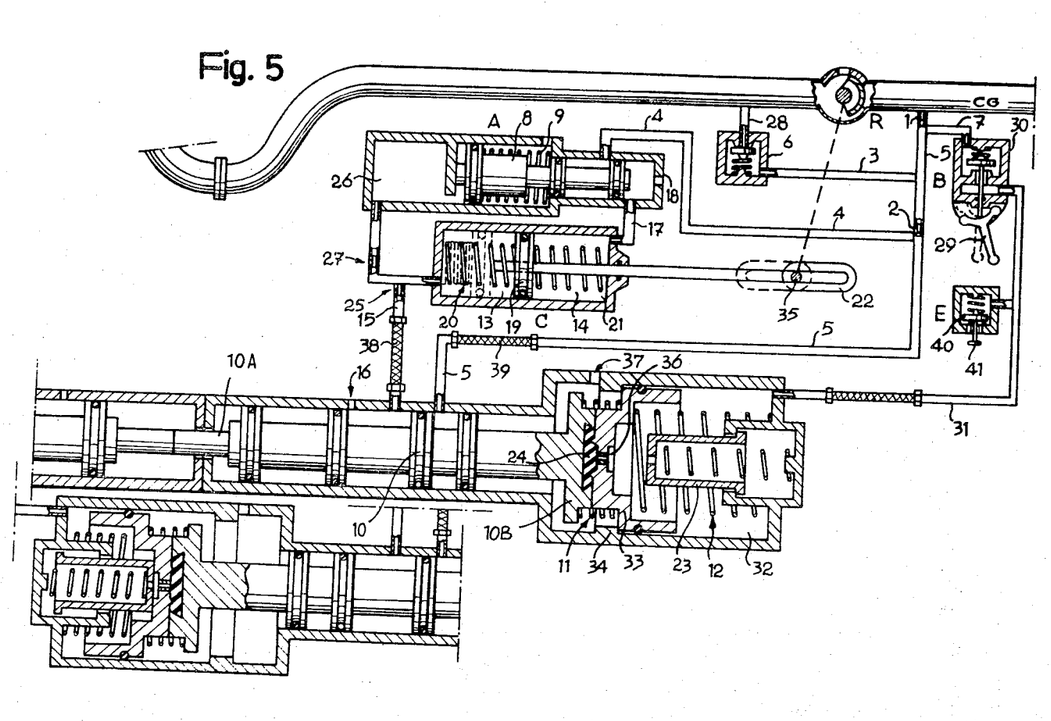

(c)   UNCOUPLING OPERATION (FIG. 5)

On uncoupling two vehicles, the lever 29 of she shut-off device B, which is connected to lever 44 (FIG. 8) by an extensible link is operated.

The valve 30 is opened and air from the brake pipe passes through conduits 7 and 31 to the distributor chamber 32 causing the piston 33 to move to the left into contact with a stop 34; the distributor stem 10 is likewise moved to the left and disconnects the conduits 5 and 15, the latter being connected to exhaust through a calibrated hole 16. The chamber 13 in the control cylinder is thereby connected with the outside through the calibrated hole 25, conduit 15 and exhaust hole 16, whereby the pressure still prevailing in the chamber 14 moves the piston 19 to the left (as shown in dashed lines in FIG. 5), thereby closing the end cock. The chamber 26 in the consent member is likewise connected to the outside through calibrated holes 27 and 25, conduit 15 and hole 16, exhaust therefrom being delayed with respect to exhaust from the chamber 13 by the provision of the calibrated hole 27. The arrangement is such that only after the piston 19 has moved to the left and effected closure of the end cock, the piston 8 is in turn moved to the left by the spring 9, thereby uncoupling the conduits 4 and 17 and connecting the conduit 17 to exhaust through the hole 18. Consequently, the chamber 14 in the control cylinder is likewise connected to the outside and, since the two chambers 13 and 14 are both connected with the outside, the piston 19 resumes its middle balanced equilibrium position by effect of the springs 20, 21. The pin 35 is then at the left of the elongated hole, whereby the end cock may, if desired, be opened by hand.

In the coupled vehicle the stem 10 of the distributor is moved to the left against the spring stop 23 under the action of its cooperating stem on the contiguous vehicle. During this operation the stem 10 of the distributor disconnects the conduits 5 and 15, connects the conduits 15 to exhaust and closes the end cock on the said contiguous vehicle, as described above.

When the vehicles are separated on completion of operation, the stems resume their inoperative position shown in FIGURE 1, the valve 24 re-opens and pressure that had been admitted to the chamber 32 is relieved to the outside through the calibrated hole 36 and exhaust 37.

If when uncoupling the vehicles have not been actually separated by uncoupling because the operation was incorrect, the operation should be annulled by moving the operating lever of the uncoupling device to its annulling position (FIG. 8), in which, in addition to re-coupling, the pneumatic annulling valve E is operated and connects the chamber 32 to exhaust through the valve 40 which is opened.

Thereupon the stems of the distributors are urged back to their coupling position, as shown in FIGURE 4, by the spring stop of the distributor on the contiguous vehicle, interconnections being re-established and the end cocks re-opened.

Figure 6:
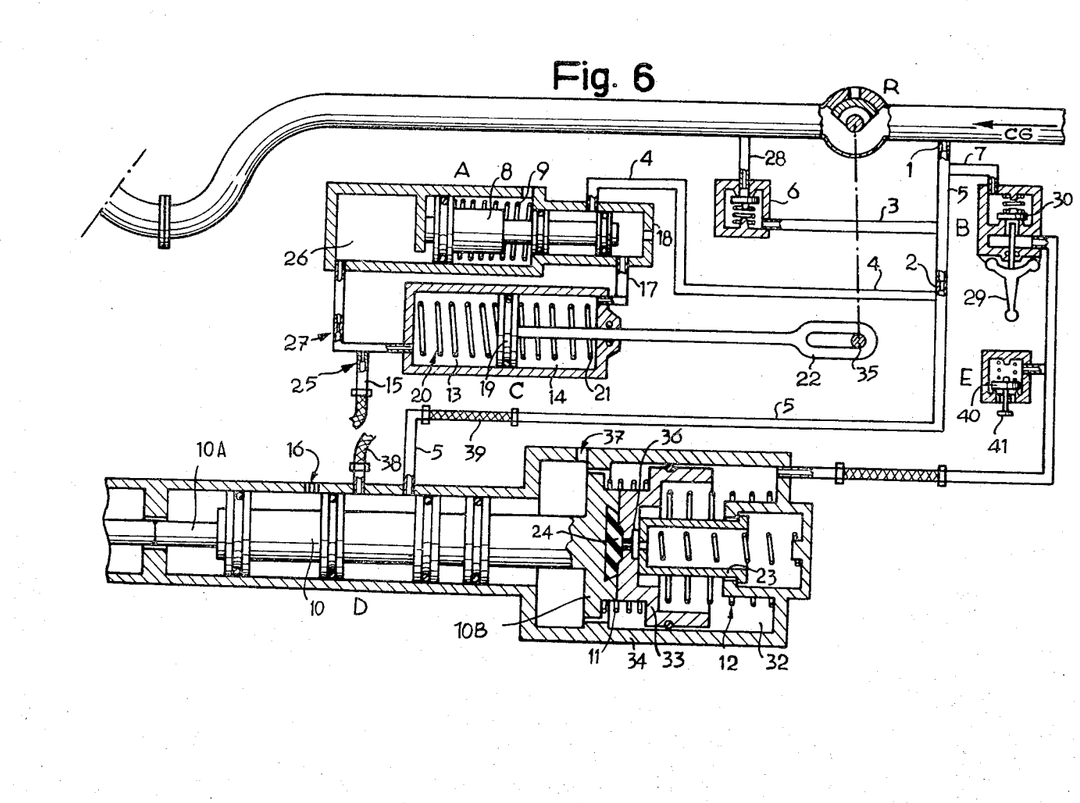

(d)  ACCIDENTAL BREAKAGE OF THE HOSES
(FIGURE 6)

Accidental breakage of one or both hoses 38, 39 or air leakage through the latter do not lead to closure of the end cocks, for the chambers 13, 14 in the control cylinder are simultaneously connected to the outside through the calibrated hole 25, conduit 15, broken hose 38 and through conduit 17, conduits 4 and 5 and broken hose 38, respectively. As mentioned above, the chamber 26 in the consent member is subsequently emptied to the outside through calibrated holes 27 and 25, conduit 15, broken hose 38, whereby the piston 8 in the consent member is urged by its spring 9 to its extreme left-hand position, shown in FIGURE 6, disconnecting the conduits 4 and 17 and connecting the conduit 17 to exhaust. This ensures exhaust from the chamber 14 which can no longer be supplied from the brake pipe through calibrated holes 1 and 2 and conduit 8, and accordingly ensures the opened position of the end cock.

(e)   BREAKAWAY OF A TRAIN
*Accidental uncoupling of two vehicles (FIGURE 7)*

Figure 7:
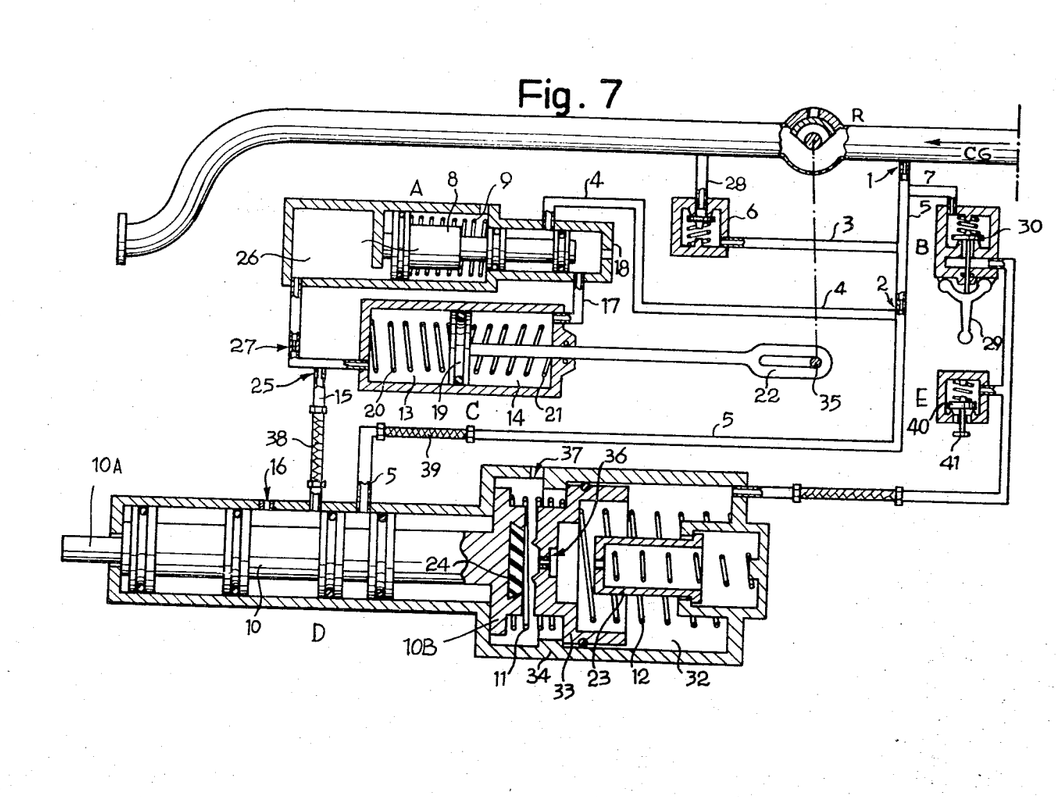

On accidental uncoupling of two vehicles the stem 10 of the distributor is moved to its inoperative position in which the conduit 15 is connected to exhaust through the calibrated hole 16.

At the same time the brake pipe is sharply evacuated through the ends of the pneumatic couplers arranged on the coupling heads. Under these conditions the coupling heads also open. Under these conditions also opening of the end cock is ensured because both chambers 13 and 14 in the control cylinder are simultaneously connected with the outside without any movement of the piston. The chamber 13 is evacuated through calibrated hole 16, whereas the chamber 14 is evacuated through the coupling head along the conduits 17, 4, calibrated hole 2, conduit 5, calibrated hole 1 and brake pipe.

At this step also and with a delay with respect to the above sequence, opening of the end cocks is ensured for direct exhaust to the outside from chamber 14 through conduit 17 and exhaust 18, because the chamber 26 in the consent member has likewish been evacuated to the outside through the calibrated hole 16, the piston 8 has consequently moved to the left disconnecting the conduits 4 and 17.

It should be noted that the protective covers for the pneumatic couplers should be arranged to avoid significantly interfering with exhaust to the outside from the brake pipe.

(f) MANUAL OPERATING OF THE END COCKS

Automatic opening and closing of the end cocks should not prevent manual operation of the cocks on a train with the brake pipe in pressure-loaded condition.

This requirement is met by means of the slide 22 on the rod of the piston 19.

Obviously, if the brake pipe on the train is pressure-loaded, the end cocks are open, and provision should simply be made for closing them without the automatic device acting to foretimely reopen them.

The device meets this requirement.

Figure 8:
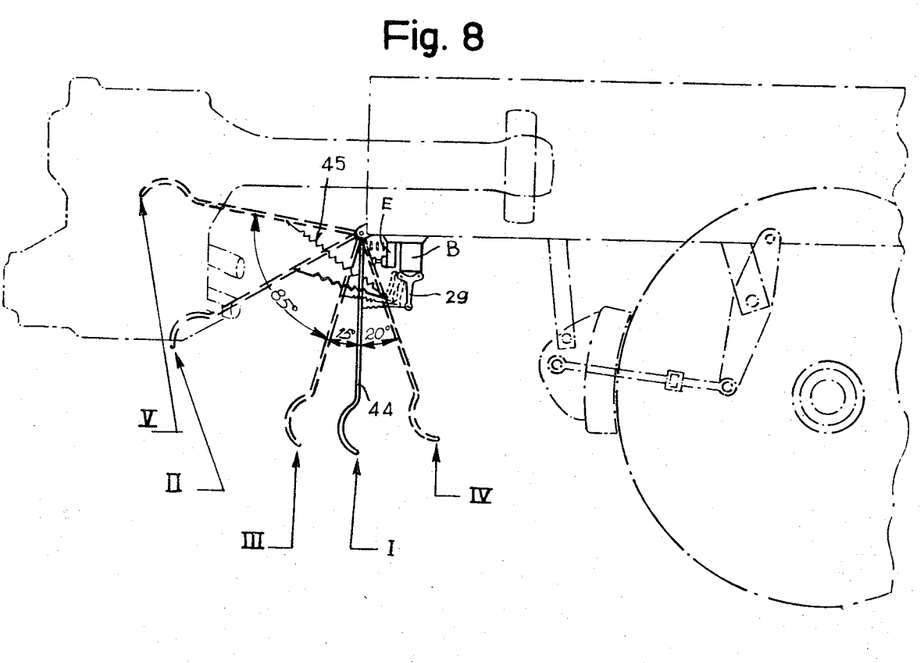
FIGURE 8 shows a detail of the device and FIGURES 9 and 10 show two modified embodiments.

If the vehicles are separated, the end cocks are reopened automatically on the next coupling. Should special requirements in marshalling require coupling for traction without opening the end cocks, the operating handle for the uncoupling device should be moved to and held in a "non-opening of the end cocks" position (FIGURE 8).

In this position the lever 29 of the shut-off device is acted upon to lift its valve 30 and admit pressure to the distributor chamber 32, which maintains the stem 10 displaced to its extreme left-hand position. As explained above this ensures closure of the end cock.

It is thereby possible to meet the requirement in standard U.I.C. 522, paragraph 25, under which provision should be made for manual closure of a cock before coupling of the two vehicles and closure should be maintained after coupling.

In order to restore automatic opening and closing control for the end cocks, the handle of the uncoupling device should simply be moved to its "annulling" position in which the push button 41 of the annulling valve E is operated, the valve 40 is opened and air supplied to the chamber 32 is discharged to the outside.

The positions of the operating lever 44 are as follows: (I) a running position in which the spring link 45 is not extended and the uncoupling valve or shut-off device B is closed; an unstable uncoupling position (II) in which the spring link 45 is stretched and the uncoupling valve B is open; a stable non-coupling position (III) of the pipes, in which the spring link 45 is held stretched and the uncoupling valve B is open; an unstable annulling position (IV) in which the link is unextended and the uncoupling valve B is closed, the lever 44 acting on the push-knob 40 of the exhaust valve E and any pressure prevailing in the chamber 32 in the distributor D is relieved; and a stable position (V) in which coupling is made impossible.

As mentioned hereinbefore, the cylindrical distributor may be arranged instead of in the coupling head, beneath the car head portion as a component of a unit further including the end cock, control cylinder and consent member, operated through a mechanical transmission of the type known by the trade name Flexball.

An embodiment of this type is shown in FIGURE 9, in which one end of the Flexball transmission F is in the coupling head and takes a position depending upon the coupling condition, its other end being connected with the stem 10 of the distributor and positions the latter accordingly.

Figure 10:
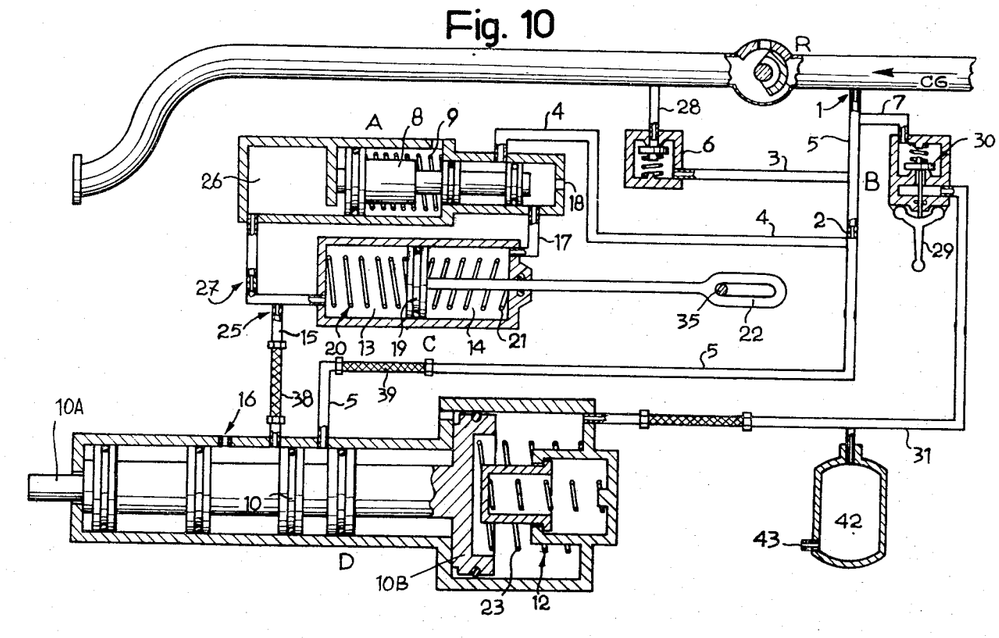

Though unaffected in operation with respect to the above this arrangement affords a reduction in size of components arranged on the coupling head and does away with hoses interconnecting the distributor and operating unit.

Where a timing of 20–30 seconds is admitted for the uncoupling operation, and this period is relied upon for actual uncoupling of two vehicles, the device could be simplified in the manner shown in FIGURE 10.

It will be seen that the annulling valve E is dispensed with, the piston of the cylindrical distributor is simplified by omitting the valve 24 and calibrated hole 26, and providing instead a cushion tank 42 of about 3 liters capacity with a calibrated hole 43 for permanent evacuation.

As distinct from the operation described in connection with FIG. 3, when uncoupling, air in the chamber 32 is evacuated through the hole 43; the vehicle should therefore be uncoupled before reservoir 42 has emptied, otherwise the stem 10 of the distributor resumes its coupling position and causes the end cocks to be reopened.

The annulling valve E is no longer required for cancelling an incorrect uncoupling operation, because cancellation takes place automatically upon evacuation of the reservoir 42.

What I claim is:

1. Apparatus for automatically controlling opening and closing of the brake pipe end cocks on uncoupling of two railway vehicles provided with automatic coupling means, comprising:
   (a) a double-acting pneumatic control cylinder having a piston which is impinged on both faces by spring means biasing it to a middle position and is operatively connected by a lost motion mechanical transmission to the end cock on the vehicle,
   (b) a pneumatic distributor having a member movable between two end positions loaded by spring return means biasing it to an extreme inoperative position, the distributor being pneumatically connected to the control cylinder in order to move the control cylinder piston from its middle position in either direction by effect of the movement of the movable member of the distributor from its extreme inoperative position to an intermediate position and from its intermediate position to its inoperative position, the movement of the movable member of the distributor between its intermediate and its extreme inoperative position, displacing the piston of the control cylinder in a direction contrary to its displacement due to movement of the movable member of the distributor between its extreme inoperative and and its intermediate position,
   (c) a pneumatic check cylinder pneumatically connected to the control cylinder and distributor to return the piston of the control cylinder to its middle position after each displacement of the control cylinder piston from its middle position, the movable member of the distributor cooperating with an abutment on a contiguous vehicle in order to be displaced from its extreme inoperative position to its intermediate position during coupling of the vehicles.

2. Device as claimed in claim 1, characterized by the fact that in the uncoupled condition of the vehicle one end of the movable member of the distributor extends beyond the distributor casing and is held in this position by the spring return means to act as a spring abutment for the end of the movable portion of the distributor of a contiguous vehicle.

3. Device as claimed in claim 2, characterized by the fact that the other end of the movable member of the distributor bears through the interposition of spring means on a piston sealingly slidable in a chamber formed in the casing of the distributor and connecting through a normally closed uncoupling valve with the brake pipe for compressed air.

4. Device as claimed in claim 3, further comprising an uncoupling valve provided with a control connected by a resiliently extensible link with a hand-operable lever, operation in one sense of the lever stretching the link thereby opening the uncoupling valve, operation in a contrary direction leaving the link unextended whereby the uncoupling valve remains closed.

5. Device as claimed in claim 4, characterized by the fact that the operating lever has an unstable position wherein the resilient link is stretched and the uncoupling valve is open.

6. Device as claimed in claim 4, characterized by the fact that the operating lever has a stable position wherein the spring link is unextended and the coupling valve is consequently closed.

7. Device as claimed in claim 4, characterized by the fact that the operating lever has a stable position wherein the resilient link is kept stretched and the uncoupling valve is consequently open.

8. Device as claimed in claim 3, characterized by the fact that the chamber in the distributor connects with the outside through a normally closed exhaust valve having an operating knob, operation of the knob opening the exhaust valve and consequently relieving pressure, if any, in the chamber in the distributor.

9. Device as claimed in claim 4, characterized by the fact that the operating lever has an unstable position wherein the link is unextended and the uncoupling valve is closed, the lever acting on the push-knob of the exhaust valve to relieve any pressure in the chamber in the distributor.

References Cited

UNITED STATES PATENTS

| 1,813,212 | 7/1931 | Thomas | 213—76 |
| 2,052,993 | 9/1936 | Tomlinson | 213—76 |
| 2,934,217 | 4/1960 | Simmons et al. | 213—76 |

DRAYTON E. HOFFMAN, *Primary Examiner.*

U.S. Cl. X.R.

213—1.3